United States Patent
Ericksen et al.

(10) Patent No.: US 9,581,264 B1
(45) Date of Patent: Feb. 28, 2017

(54) HOSE TAP TIMER DEVICE AND METHOD

(71) Applicant: Orbit Irrigation Products, Inc., North Salt Lake, UT (US)

(72) Inventors: Kent C. Ericksen, Centerville, UT (US); Karl L. Connolly, Bountiful, UT (US); Andrew Mark Urry, Herriman, UT (US); Amy Marie Yamasaki, Fruit Heights, UT (US); Hugo Rodriguez, South Salt Lake, UT (US)

(73) Assignee: Orbit Irrigation Products, Inc., North Salt Lake, UT (US)

( * ) Notice: Subject to any disclaimer, the term of this patent is extended or adjusted under 35 U.S.C. 154(b) by 55 days.

(21) Appl. No.: 14/719,277

(22) Filed: May 21, 2015

(51) Int. Cl.
| | |
|---|---|
| *F16K 31/02* | (2006.01) |
| *A01G 27/00* | (2006.01) |
| *A01G 25/16* | (2006.01) |

(52) U.S. Cl.
CPC .............. *F16K 31/02* (2013.01); *A01G 25/16* (2013.01); *A01G 25/165* (2013.01); *A01G 27/003* (2013.01); *A01G 27/008* (2013.01); *Y10T 137/86389* (2015.04); *Y10T 137/86397* (2015.04); *Y10T 137/87877* (2015.04)

(58) Field of Classification Search
CPC ..... Y10T 137/86389; Y10T 137/86397; Y10T 137/87877; A01G 25/16; A01G 25/165
USPC ......... 239/67, 69, 70, 550, 551; 137/624.11, 137/624.12, 883; 700/282
See application file for complete search history.

(56) References Cited

U.S. PATENT DOCUMENTS

| | | | | |
|---|---|---|---|---|
| 4,592,505 A | * | 6/1986 | Bruninga | A01G 25/16 137/624.18 |
| 4,858,827 A | * | 8/1989 | Fletcher | A01G 25/16 137/624.18 |
| 5,921,280 A | * | 7/1999 | Ericksen | A01G 25/167 137/624.11 |
| 6,337,635 B1 | * | 1/2002 | Ericksen | A01G 25/165 137/624.11 |
| D467,187 S | | 12/2002 | Clivio | |
| D485,502 S | | 1/2004 | Clivio | |
| D494,074 S | | 8/2004 | Ishii | |
| 6,932,277 B1 | * | 8/2005 | Ericksen | A01G 25/165 137/624.12 |
| 7,203,576 B1 | * | 4/2007 | Wilson | A01G 25/165 137/78.3 |
| D558,075 S | | 12/2007 | Ishii | |
| D575,168 S | | 8/2008 | King et al. | |
| D587,141 S | | 2/2009 | King et al. | |
| D605,959 S | | 12/2009 | Apothèloz | |
| 8,104,509 B2 | * | 1/2012 | Leer | A01G 25/165 137/552.7 |
| D656,046 S | | 3/2012 | Mackay et al. | |
| 8,251,300 B2 | | 8/2012 | Wilson | |
| D691,243 S | | 10/2013 | Meyer | |

(Continued)

OTHER PUBLICATIONS

U.S. Appl. No. 29/527,490, filed May 21, 2015, Orbit Irrigation Products, Inc.

(Continued)

*Primary Examiner* — Matthew W Jellett
(74) *Attorney, Agent, or Firm* — Austin Rapp & Hardman

(57) ABSTRACT

A hose tap timer is disclosed comprising structure for shutting off the hose tap timer valves when a control member is separated from or attached to a dock for a manifold member of the hose tap timer.

8 Claims, 9 Drawing Sheets

(56) References Cited

U.S. PATENT DOCUMENTS

| | | | |
|---|---|---|---|
| D702,566 S | 4/2014 | Apotheloz | |
| D723,953 S | 3/2015 | Ishii | |
| 8,998,117 B2* | 4/2015 | Bauman | A01G 25/097 239/69 |
| D747,983 S | 1/2016 | Salama | |
| 2002/0066878 A1 | 6/2002 | Wang et al. | |
| 2006/0011243 A1 | 1/2006 | Jacobs et al. | |
| 2009/0008471 A1* | 1/2009 | Wilson | A01G 25/16 239/69 |
| 2009/0008472 A1* | 1/2009 | Wilson | A01G 25/165 239/71 |
| 2010/0163126 A1 | 7/2010 | Leer et al. | |
| 2010/0198418 A1* | 8/2010 | Williams | A01G 25/16 700/284 |
| 2015/0061546 A1 | 3/2015 | Stack et al. | |

OTHER PUBLICATIONS

Orbit Irrigation Products, Inc., The products shown in Attachment 1 were sold or offered by for sale by Orbit Irrigation Products, Inc., on or before May 20, 2014.

Hose Faucet Model 62001/62401 Installation and User's Guide, publication, Orbit Irrigation Products, Inc., [retrieved on May 1, 2016], pp. 1-29, Published on or before Mar. 24, 2003 (See, e.g., pp. 10 and 11).

Non-Final Office Action, U.S. Appl. No. 29/527,490, Mailed on May 10, 2016 (shown in attachment 3).

Non-Final Office Action Response, U.S. Appl. No. 29/527,490, Dated Sep. 12, 2016 (shown in attachment 4).

Orbit Irrigation Products, Inc.,"Orbit 4 station sprinkler timer." Accessed: Apr. 27, 2016. eBay. <URL: http://www.ebay.com/itm/orbit-4-station-sprinkler-timer-with-easy-set-logic-91 894/27221 0039846?_trksid=p2047675.c100011 . m 1 850&_trkparms=aid%3 D222007%26algo%3 ?S IC. MB E%26ao%3D 1 %26 asc%3 D36499%26meid%3 D592c830b920a4 7159decaa78311 7 de24%26pid%3D1 00011 %26rk%3D2%26rkt%3D1 0%26sd%3 D> (shown in attachment 5).

Orbit Irrigation Products, Inc., "Orbit 6 station sprinkler timer." Accessed: Apr. 27, 2016 jet. <URL: https://jet.com/product/detail/86364bff6b3141338b0483da 7ca7b4be?jcmp=pla:ggl:cwin_home_garden_a2: lawn_garden_watering_irrigation_sprinklers_sprinkler_heads_a2_other:na:na:na:na:na:2&code=PLA15 &ds_c=cwin_home_garden_a28&ds_cid&ds_ag=lawn_garden_watering_irrigation_sprinklers_sprinkler he> (shown in attachment 6).

\* cited by examiner

HOSE TAP TIMER DEVICE AND METHOD

TECHNICAL FIELD

The present invention relates generally to an irrigation controller and, more particularly, relates to a hose tap timer.

BACKGROUND

Hose tap timers are used to control irrigation of, for example, a lawn or garden area without the need to construct an underground watering system. However, improvements in usability, functionality, and construction of hose tap timers are desirable.

SUMMARY

Embodiments of the disclosed subject matter are provided below for illustrative purposes and are in no way limiting of the claimed subject matter.

A hose tap timer is disclosed. The hose tap timer may comprise a control member.

The control member may comprise a processor.

The control member may further comprise a memory component in electronic communication with the processor. The memory component may comprise control data specifying when electronic signals will be sent to a particular valve.

The control member may further comprise at least a first contact prong, a second contact prong, and a third contact prong.

The control member may also comprise a signal circuitry component in communication with the processor and in communication with each of the first contact prong, second contact prong, and third contact prong.

The watering device may comprise a manifold member. A manifold member may comprise a fluid input coupling.

The manifold member may comprise one or more fluid output couplings. Each of the one or more fluid output couplings may be in fluid communication with the fluid input coupling along a fluid pathway associated with each of the one or more fluid output couplings.

The manifold member may comprise a valve coupled to each fluid pathway. The valve may be controllable in response to electronic signals to move between an open and a closed state.

The manifold member may further comprise a dock shaped to receive the control member in an entry engaging position, an intermediate engaging position, and a fully engaged position.

The dock of the manifold member may comprise an electronic contact panel having a first dimension and a second dimension. The first dimension may be perpendicular to the second dimension. The electronic contact panel may comprise an entry end, an entry region, an intermediate region, a fully engaged region, and a fully engaged end. The entry region may be disposed intermediate the entry end and the intermediate region along the first dimension, and the fully engaged region may be disposed intermediate the intermediate region and the fully engaged end along the first dimension.

The electronic contact panel may comprise a first electronic contact strip that may extend continuously along the first dimension from the entry end to the fully engaged end.

The electronic contact panel may further comprise an intermittent electronic contact pathway extending along the first dimension from the entry end to the fully engaged end. The intermittent electronic contact pathway may be offset from the first electronic contact strip along the second dimension. The intermittent electronic contact pathway may comprise a first noncontact region disposed within the entry region, an electronic contact region disposed within the intermediate region, and a second noncontact region disposed within the fully engaged region.

In certain embodiments, when the control member is in the entry engaging position, the first contact prong is positioned on the control member to contact the first electronic contact strip within the entry region and the second and third contact prongs are positioned on the control member to contact the first noncontact region.

In certain embodiments, when the control member is in the intermediate engaging position, the first contact prong is positioned on the control member to contact the first electronic contact strip within the intermediate region and the second and third contact prongs are positioned on the control member to contact the electronic contact region.

In certain embodiments, when the control member is in the fully engaged position, the first contact prong is positioned on the control member to contact the first electronic contact strip within the fully engaged region, the second contact prong is positioned on the control member to contact the second noncontact region and the third contact prong is positioned on the control member to contact the electronic contact region.

In certain embodiments, in response to the second and third contact prongs simultaneously contacting the electronic contact region, the control data is configured to transmit a close valve signal via the first contact prong.

In certain embodiments, in response to the second and third contact prongs simultaneously contacting the electronic contact region, the control data is configured to transmit a close valve signal via the first contact prong only if a valve in electronic communication with the first contact prong is in an open state.

The hose tap timer may further comprise a display screen in electronic communication with the processor. In addition, the hose tap timer may further comprise one or more user controls in electronic communication with the processor for altering the control data.

Another embodiment of a hose tap timer including additional or alternative features is disclosed. The hose tap timer may comprise a control member having circuitry configured to control valves in a manifold member. The control member may be connectable to a dock of the manifold member.

The manifold member may comprise a fluid input coupling. The manifold member may also comprise a first fluid output coupling in fluid communication with the fluid input coupling via a first fluid communication pathway. The first fluid output coupling may have a first fluid output opening. The first fluid output opening may have a first fluid output opening center point.

The manifold member may comprise a first valve coupled to the first fluid communication pathway for controlling fluid flow through the first fluid communication pathway.

The manifold member may further comprise a second fluid output coupling in fluid communication with the fluid input coupling via a second fluid communication pathway. The second fluid output coupling may have a second fluid output opening. The second fluid output opening may have a second fluid output opening center point.

The manifold member may further comprise a second valve coupled to the first fluid communication pathway for controlling fluid flow through the second fluid communication pathway.

The manifold member may further comprise a third fluid output coupling in fluid communication with the fluid input coupling via a third fluid communication pathway. The third fluid output coupling may have a third fluid output opening. The third fluid output opening may have a third fluid output opening center point.

The manifold member may also comprise a third valve coupled to the third fluid communication pathway for controlling fluid flow through the third fluid communication pathway.

The manifold member may comprise a fourth fluid output coupling in fluid communication with the fluid input coupling via a fourth fluid communication pathway. The fourth fluid output coupling may have a fourth fluid output opening. The fourth fluid output opening may have a fourth fluid output opening center point.

The manifold member may also comprise a fourth valve coupled to the fourth fluid communication pathway for controlling fluid flow through the fourth fluid communication pathway.

The manifold member comprises a side.

In certain embodiments, each of the first fluid output coupling, the second fluid output coupling, the third fluid output coupling, and the fourth fluid output coupling, are positioned on the side of the manifold member.

In certain embodiments, the first fluid output opening center point, the second fluid output opening center point, the third fluid output opening center point, and the fourth fluid output opening center point are arranged in a trapezoidal configuration.

In certain embodiments, the trapezoidal configuration comprises an isosceles trapezoidal configuration.

In certain embodiments, the manifold member may comprise a first dimension, a second dimension, and a third dimension with the first dimension being perpendicular to the second dimension, and the third dimension being perpendicular to both the first dimension and the second dimension. In certain embodiments, the first fluid output opening center point, the second fluid output opening center point, the third fluid output opening center point, and the fourth fluid output opening center point are aligned with respect to the first dimension.

In certain embodiments, the first fluid output opening center point and the second fluid output opening center point are aligned along the third dimension, but offset along the second dimension.

In certain embodiments, the third fluid output opening center point and the fourth fluid output opening center point are aligned along the third dimension, but offset along the second dimension.

In certain embodiments, the third fluid output opening center point and the fourth fluid output opening center point are positioned intermediate the first fluid output opening center point and the second fluid output opening center point along the second dimension.

In certain embodiments, the first valve may comprise a first valve longitudinal axis, the second valve may comprise a second valve longitudinal axis, the third valve may comprise a third valve longitudinal axis, and the fourth valve may comprise a fourth valve longitudinal axis.

In certain embodiments, the third valve longitudinal axis may extend outwardly away from the third fluid communication pathway and may be substantially parallel with the second dimension, and the fourth valve longitudinal axis may extend outwardly away from the fourth fluid communication pathway and may be substantially parallel with the second dimension.

In certain embodiments, the first valve longitudinal axis may extend away from the first fluid communication pathway substantially toward the fourth fluid communication pathway, and the second valve longitudinal axis may extend from the second fluid communication pathway substantially toward the third fluid communication pathway.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings, in which:

Figure 1:
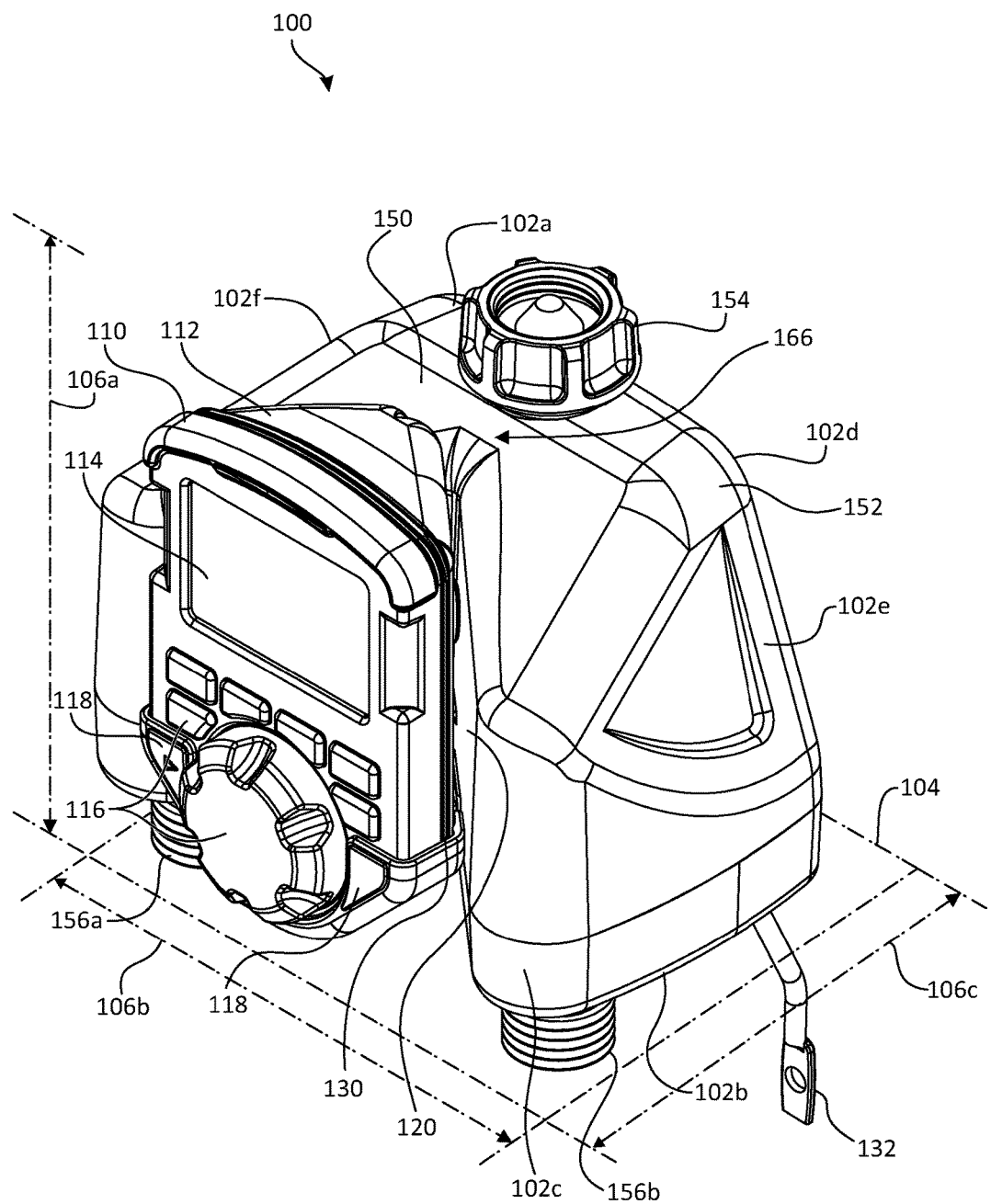
FIG. 1 is a perspective view of one embodiment of a hose tap timer.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure and/or functionality in addition to, or other than, one or more of the aspects set forth herein based on information known to one of skill in the art.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The phrases "an embodiment," "in certain embodiments," "an alternative embodiment" or "one embodiment" may refer to various configurations or embodiments of the disclosed apparatuses, systems or methods, in the singular or plural form, rather than referring to a single, particular embodiment.

Although multiple instances of various features and components may be shown in the figures, only a limited number of those features or components may be referenced with the lead line and reference numeral to avoid confusion stemming from an excessive number of lead lines and reference numerals.

As used in this application, the term "adjacent" signifies next to or near.

Figure 2:
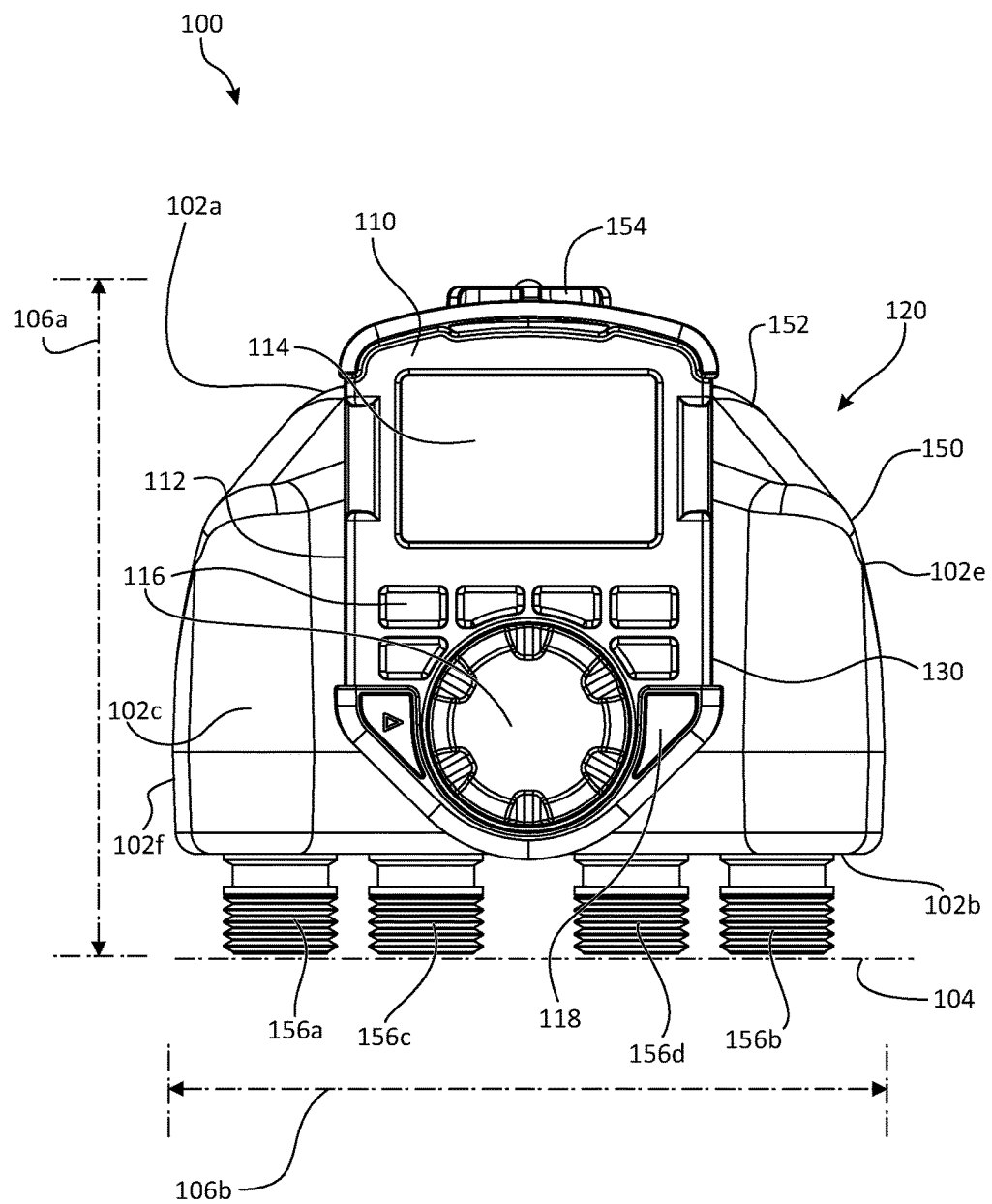
FIG. 2 is a front view of the embodiment of the hose tap timer shown in FIG. 1 with the support bracket omitted for simplicity.

FIGS. 1 and 2 will be discussed concurrently. FIG. 1 is a perspective view of one embodiment of a hose tap timer 100, while FIG. 2 is a front view of the hose tap timer 100. In the discussion below related to FIGS. 1 and 2, the referenced parts are illustrated and identified in either both or only one of FIGS. 1 and 2. The hose tap timer 100 may include a control member 110 and a manifold member 150. The control member 110 may be selectively received into a dock 120 of the manifold member 150. As illustrated in FIGS. 1 and 2, the control member 110 is in a fully engaged position with respect to the manifold member 150.

The control member 110 may include a display screen 114 and user controls 116. The display screen 114 displays information related to the control member 110, such as setting options, current settings, and/or the state of the control member 110. The display screen 114 may comprise, for example, a liquid crystal display (LCD), organic light-emitting diode (OLED) display, e-ink display, etc. The user controls 116 may comprise physical controls (e.g., physical buttons or dials, as illustrated in FIGS. 1 and 2), electronic controls (e.g., electronic buttons, electronic dials, electronic check boxes, electronic input boxes together with an electronic keyboard displayed on a touch or pen-based screen). The control member 110 may include electronic components that may be placed in electronic communication with valves disposed within the manifold member 150. (Both the electronic components and valves will be discussed in connection with subsequent figures.) The electronic components may transmit open and close valve signals to one or more of the valves within the manifold member 150 in accordance with data stored within the control member 110.

The manifold member 150 includes a fluid input coupling 154 and one or more fluid output couplings 156a-d, such as a first fluid output coupling 156a, a second fluid output coupling 156b, a third fluid output coupling 156c and a fourth fluid output coupling 156d. The fluid input coupling 154 may be connected to a source of pressurized fluid (e.g., water) through, for example, a hose tap or spigot. Hose taps or spigots are often located adjacent to or on the exterior of a home or business, although hose taps and spigots may be located elsewhere, such as adjacent to an agricultural area or a flower bed. As indicated above, the manifold member 150 may include a series of valves, each of which controls whether and to what extent pressurized fluid entering through the fluid input coupling 154 exits the manifold member 150 through one or more of the fluid output couplings 156a-d.

The manifold member 150 may have a top side 102a, a bottom side 102b, a front side 102c, a back side 102d, a first lateral side 102e and a second lateral side 102f. The dock 120 may be positioned on the front side 102c of the manifold member 150 within a V-shaped alcove 166.

The dock 120 may comprise a recess 130 defined by one or more retaining extensions 118. The recess 130 may receive the control member 110 with the one or more retaining extensions 118 of the manifold member 150 retaining the control member 110 within the dock 120 with the assistance, for example, of a gravitational force or a securing mechanism (not shown).

The manifold member 150 may further comprise a first dimension 106a (such as height), a second dimension 106b (such as width) and a third dimension 106c (such as depth). The first dimension 106a, the second dimension 106b and the third dimension 106c may be mutually perpendicular, as illustrated in FIG. 1 and as partially illustrated in FIG. 2.

The remote ends or openings of the fluid output couplings 156a-d may be disposed within a planar region 104. The planar region 104 may extend along a portion of or a point on the first dimension 106a and may extend along the entirety of the second dimension 106b and the third dimension 106c.

The hose tap timer 100 may further comprise a support bracket 132. The support bracket 132 may be used together with a screw or nut and bolt (or other type of securing mechanism) to secure the hose tap timer 100 to a wall or other structure adjacent to a hose tap or spigot, to which the fluid input coupling 154 of the hose tap timer 100 may be secured.

The hose tap timer 100 illustrated in FIGS. 1 and 2 is merely exemplary. For example, the particular shape of the manifold member 150 and the control member 110 may be varied within the scope of the disclosed subject matter. As an additional example, the V-shaped alcove 166 may have a generally U-shaped configuration or another type of curvilinear or linear shape. Also, the number and positioning, for example, of the display screen 114, user controls 116, fluid output couplings 156a-d and retaining extensions 118 may be varied within the scope of the disclosed subject matter. Also, the fluid input coupling 154 and one or more of the fluid output couplings 156a-d illustrated in FIGS. 1 and 2 may employ a threaded type coupling mechanism. Alternatively, for example, one or more of these couplings 154, 156a-d may comprise a quick-connect fitting, a cam-and-groove fitting or other type of fitting.

As illustrated in FIGS. 1 and 2, both the control member 110 and the manifold member 150 may comprise a housing 112, 152. Both the housing 112 for the control member 110 and the housing 152 for the manifold member 150 shield and protect internal components of the control member 110 and the manifold member 150. It should also be noted that the housings 112, 152 may each be formed of a plurality of different subcomponents.

Figure 3:
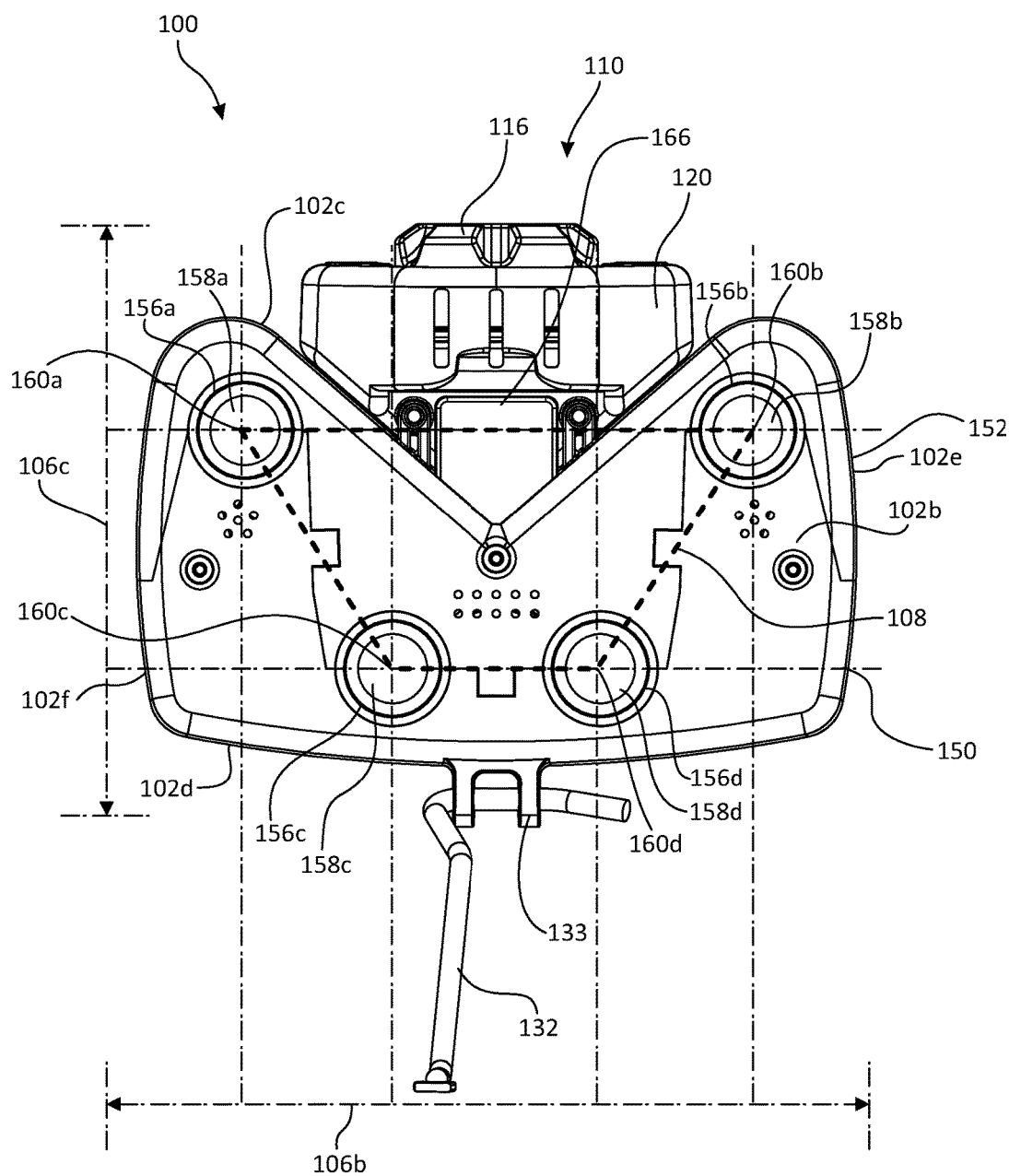
FIG. 3 is a bottom view of the embodiment of the hose tap timer shown in FIG. 1.

FIG. 3 is a bottom view of the embodiment of the hose tap timer 100 shown in FIG. 1. As illustrated in FIG. 3, the hose tap timer 100 includes a control member 110 and a manifold member 150. The illustrated hose tap timer 100 includes the control member 110 having one or more user controls 116. The manifold member 150, as illustrated in the bottom view of FIG. 3, may include a V-shaped alcove 166, in which the dock 120 is situated.

As indicated previously, the manifold member 150 may include a bottom side 102b, a top side 102a (illustrated in FIG. 1), a front side 102c, a back side 102d, a first lateral side 102e, and a second lateral side 102f. The bottom side 102b is intermediate a front side 102c and a back side 102d along the third dimension 106c and is also intermediate a first lateral side 102e and a second lateral side 102f along the second dimension 106b.

In the illustrated embodiment, the first fluid output coupling 156a, second fluid output coupling 156b, third fluid output coupling 156c and fourth fluid output coupling 156d are positioned on the bottom side 102b of the manifold member 150. Each of the output couplings 156a-d comprise an output opening 158a-d. Each of the output openings 158a-d is positioned within the planar region 104 with respect to the first dimension 106a (the planar region 104 and first dimension 106a are illustrated in FIG. 2, but are not shown in FIG. 3). Each of the output openings 158a-d comprise a fluid output opening center 160a-d, which is positioned in the center of each of the output openings 158a-d in the planar region 104.

As illustrated in FIG. 3, the fluid output opening centers 160a-d are arranged in a trapezoidal configuration 108 (i.e., using each of the fluid output opening centers 160a-d as a corner of a trapezoid), which configuration 108 is illustrated by the broken lines identified by reference numeral 108. As specifically illustrated in FIG. 3, the trapezoidal configuration 108 may comprise an isosceles trapezoidal configuration 108.

The first fluid output opening center 160a and the second fluid output opening center 160b are aligned along the third dimension 106c, but are offset with respect to each other along the second dimension 106b. Likewise, the third fluid output opening center 160c and the fourth fluid output opening center 160d are aligned along the third dimension 106c, but are offset with respect to each other along the second dimension 106b. It should also be noted that the third fluid output opening center 160c and the fourth fluid output opening center 160d are disposed intermediate the first fluid output opening center 160a and the second fluid output opening center 160b along the second dimension 106b. Further, the third fluid output opening center 160c and the fourth fluid output opening center 160d are disposed intermediate the back side 102d and the first fluid output opening center 160a and the second fluid output opening center 160b along the third dimension 106c. In contrast, the first fluid output opening center 160a and the second fluid output opening center 160b are disposed intermediate the front side 102c and the third fluid output opening center 160c and the fourth fluid output opening center 160d along the third dimension 106c.

It should also be noted that FIG. 3 provides a bottom view of one embodiment of a support bracket 132. As illustrated in FIG. 3, the manifold member 150 may comprise a housing 152. The housing 152 may comprise a support bracket holder 133. The support bracket holder 133 receives the support bracket 132 and may maintain the support bracket 132 in a desired orientation with respect to the manifold member 150 via friction engagement between the support bracket 132 and the support bracket holder 133.

The embodiment illustrated in FIG. 3 is only exemplary. For example, the trapezoidal configuration 108 is entirely aligned along the first dimension 106a. In an alternative embodiment, one or more of the fluid output opening centers 160a-d may not be aligned with the others along the first dimension 106a and, yet, still maintain a trapezoidal configuration 108 (i.e., using each of the fluid output opening centers 160a-d as a corner for a trapezoid).

Figure 4:
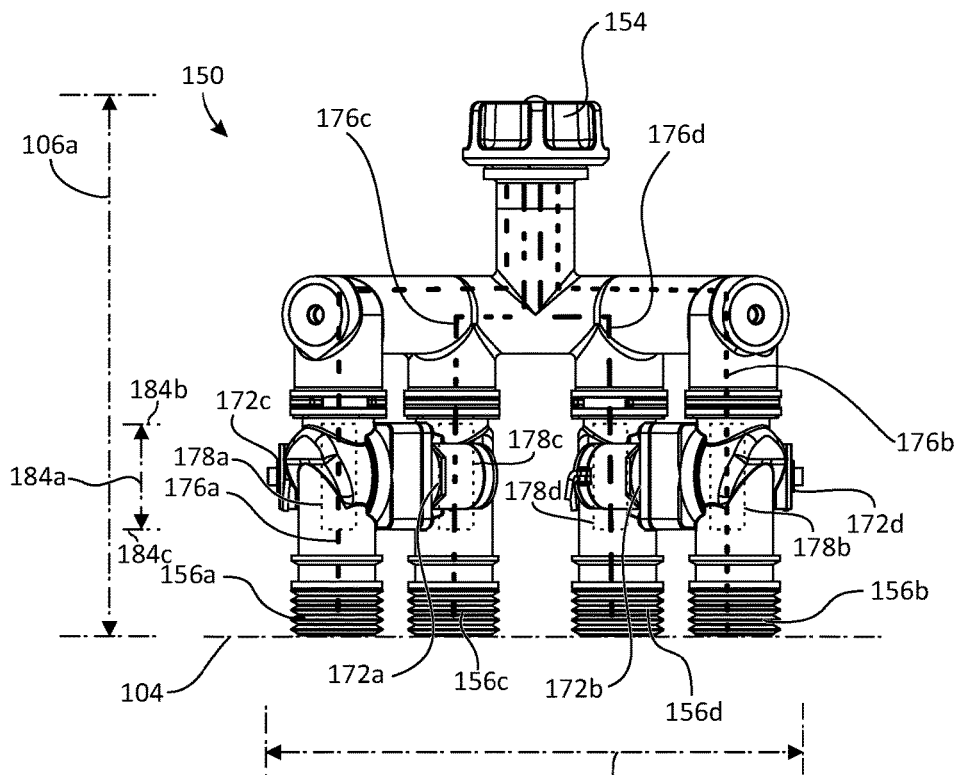
FIG. 4 is a front view of one embodiment of a manifold member of the hose tap timer of FIG. 1 with the housing of the manifold member being omitted.

FIG. 4 is a front view of one embodiment of a manifold member 150 of the hose tap timer 100 of FIG. 1 with the housing 152 of the manifold member 150 (shown in FIG. 3) being omitted. FIG. 4 illustrates four fluid flow pathways 176a-d, each of which is shown in a different broken line pattern. Each of the fluid flow pathways 176a-d extends from the fluid input coupling 154 to one of the fluid output couplings 156a-d along the first dimension 106a and a portion of the second dimension 106b and the third dimension 106c (shown, for example in FIG. 1).

A first valve 172a is coupled to the first fluid flow pathway 176a and controls the flow of a fluid from the fluid input coupling 154 to the first fluid output coupling 156a; a second valve 172b is coupled to the second fluid flow pathway 176b and controls the flow of a fluid from the fluid input coupling 154 to the second fluid output coupling 156b; a third valve 172c is coupled to the third fluid flow pathway 176c and controls the flow of a fluid from the fluid input coupling 154 to the third fluid output coupling 156c; and a fourth valve 172d is coupled to the fourth fluid flow pathway 176d and controls the flow of a fluid from the fluid input coupling 154 to the fourth fluid output coupling 156d. (Only a small portion of the third valve 172c and fourth valve 172d are visible in FIG. 4, as the majority of these valves 172c-d are obscured by the first and second valves 172a-b.)

An adjacent portion 178a-d of each of the fluid flow pathways 176a-d is adjacent to each valve 172a-d. The adjacent portion 178a-d of each pathway 176a-d may comprise the portion of the pertinent pathway 176a-d from the most downstream portion 184b of the pertinent valve 172a-d to the most upstream portion 184c of the pertinent valve 172a-d along the first dimension 106a.

As illustrated in FIG. 4, the fluid output couplings 156c-d extend along the first dimension 106a until the planar region 104. Further, as can be seen from this figure, each of the fluid output couplings 156a-d are offset from one another along the second dimension 106b.

It should be appreciated that the embodiment illustrated in FIG. 4 is merely exemplary and variations come within the scope of the disclosed subject matter. For example, fluid output couplings 156a-d may be offset from each other along the first dimension 106a, rather than being aligned with respect to the first dimension 106a, as illustrated in FIG. 3. Accordingly, the planar region 104 may be disposed at an angle, for example, with respect to the third dimension 106c. In addition, the planar region 104 (in which the fluid output opening centers 160a-d are positioned) may have volume (as opposed to being a flat plane) and may be, for example, rectangular in shape.

Figure 5:
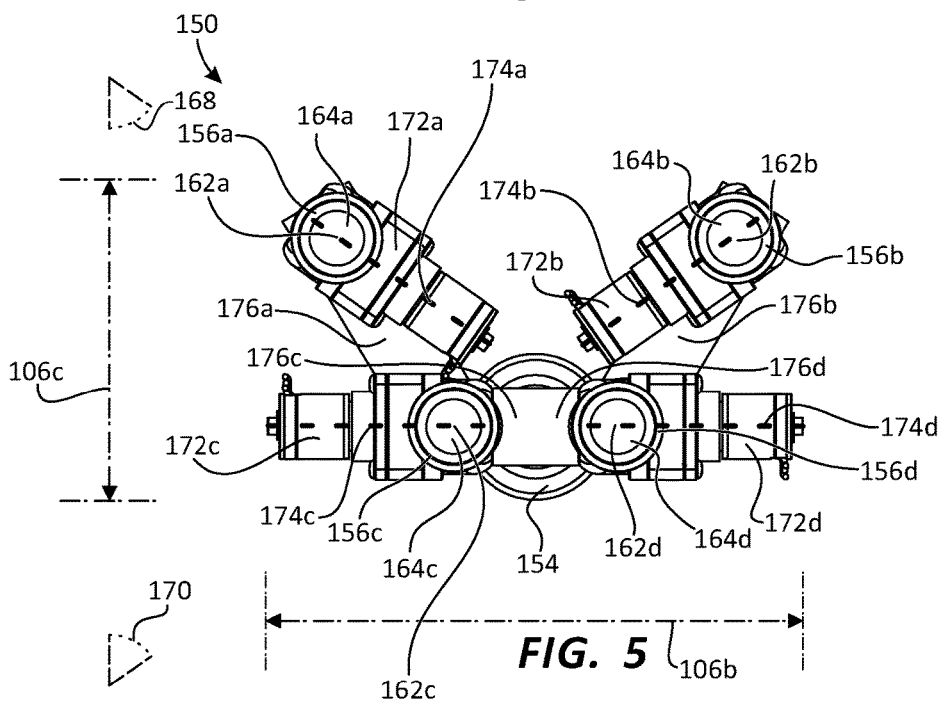
FIG. 5 is a bottom view of one embodiment of a manifold member of the hose tap timer of FIG. 1 with the housing of the manifold member being omitted.

FIG. 5 is a bottom view of one embodiment of a manifold member 150 of the hose tap timer 100 of FIG. 1 with the housing 152 of the manifold member 150 being omitted. FIG. 5 provides a better view of the four valves 172a-d. Each of the four valves 172a-d includes a longitudinal axis 174a-d. More specifically, the first valve 172a includes a first valve longitudinal axis 174a; the second valve 172b includes a second valve longitudinal axis 174b; the third valve 172c includes a third valve longitudinal axis 174c; and the fourth valve 172d includes a fourth valve longitudinal axis 174d.

The first valve longitudinal axis 174a extends from the point where the first valve 172a intersects the first fluid flow pathway 176a towards the fourth fluid flow pathway 176d (more specifically, towards the adjacent portion 178d of the fourth fluid flow pathway 176d, which is illustrated in FIG. 4). For example, the first valve longitudinal axis 174a may be disposed at an inward angle 168 of approximately 55° (i.e., within 5° of 55°) with respect to the third dimension 106c. Alternatively, the first valve longitudinal axis 174a may extend substantially toward the adjacent portion 178d of the fourth fluid flow pathway 176d (that is, within 30° of pointing directly toward the fourth fluid flow pathway 176d).

The second valve longitudinal axis 174b extends from the point where the second valve 172b intersects the second fluid flow pathway 176b towards the third fluid flow pathway 176c (more specifically, towards the adjacent portion 178c of the third fluid flow pathway 176c, which is illustrated in FIG. 4). For example, the second valve longitudinal axis 174b may be disposed dimension 106c. Alternatively, the second valve longitudinal axis 174b may extend substantially toward the third fluid flow pathway 176c (that is, within 30° of pointing directly toward the adjacent portion 178c of the third fluid flow pathway 176c).

The third valve longitudinal axis 174c extends outwardly away from the third fluid flow pathway 176c and is generally parallel with the second dimension 106b. The fourth valve longitudinal axis 174d extends outwardly away from the fourth fluid flow pathway 176d and is generally parallel with the second dimension 106b.

As indicated above and as illustrated in FIG. 5, each of the fluid output couplings 156a-d may include an output opening 164a-d having a center point 162a-d.

Figure 6:
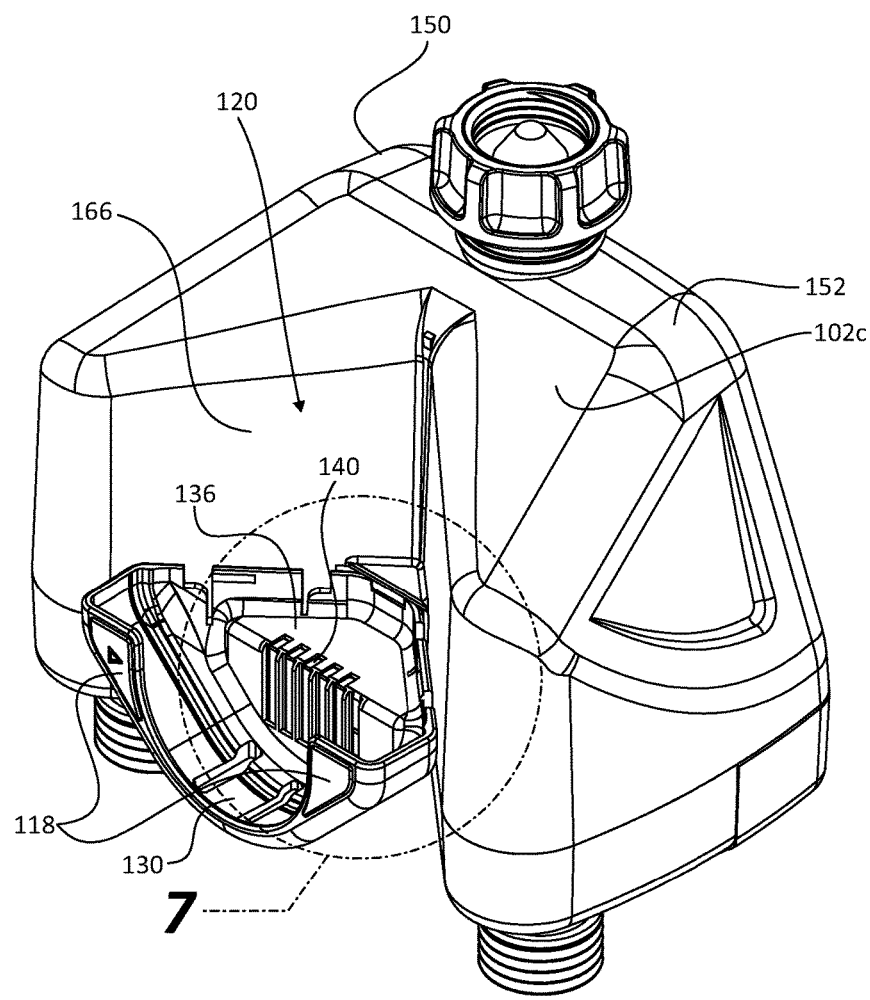
FIG. 6 is a perspective view of the manifold member of the hose tap timer of FIG. 1, including the housing of the manifold member.

FIG. 6 is a perspective view of the manifold member 150 of FIG. 1, including the housing 152 of the manifold member 150. The front side 102c comprises a V-shaped alcove 166. The dock 120 is positioned within the V-shaped alcove 166. The dock 120 comprises a step 136 and an electronic contact panel 140 positioned on the step 136. As indicated previously, the dock 120 further comprises one or more retaining extensions 118 that define a recess 130 shaped to receive the control member 110. (The control member 110 is shown in prior figures.)

Figure 7:
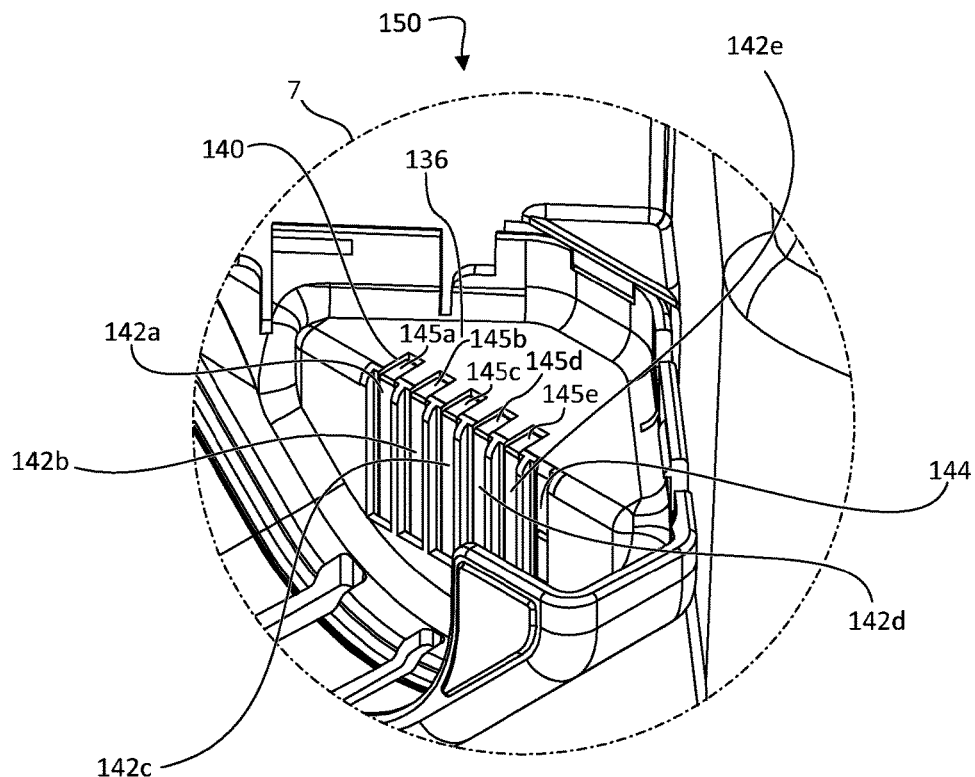
FIG. 7 is a perspective, enlarged view of the region 7 in FIG. 6.
Figure 8:
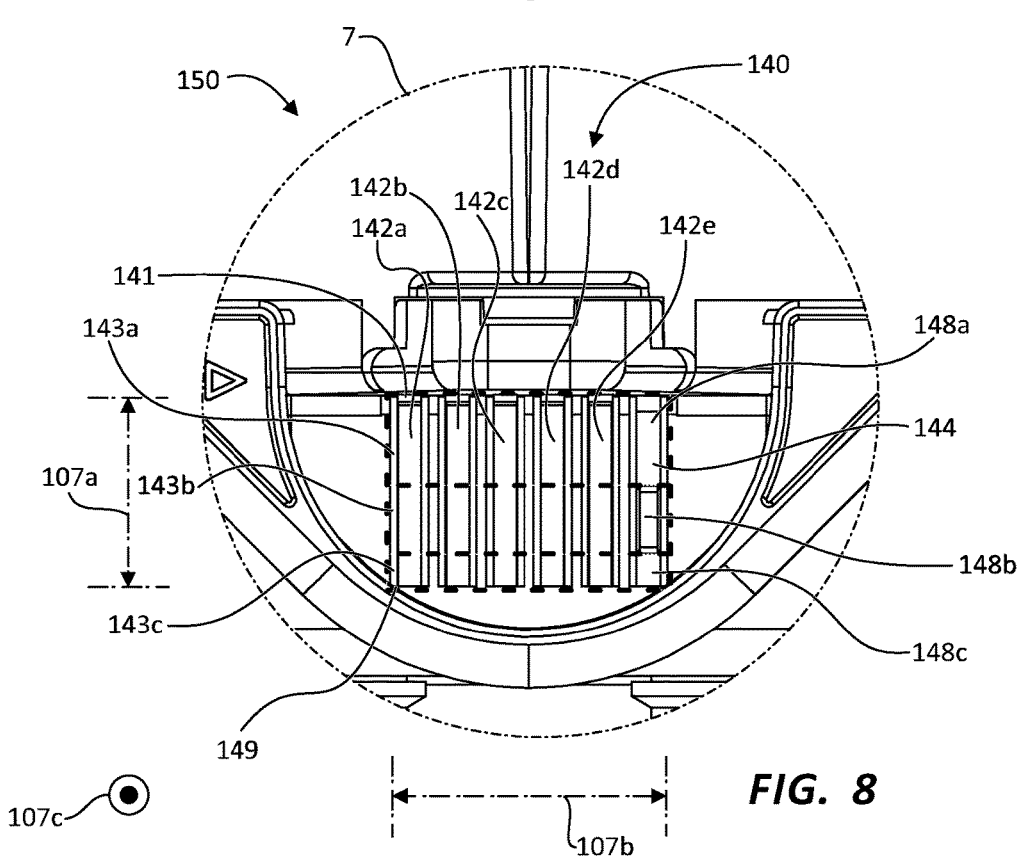
FIG. 8 is a front, enlarged view of the region shown in FIG. 7.

FIG. 7 is a perspective, enlarged view of the region 7 of FIG. 6, while FIG. 8 is a front, enlarged view of region 7. FIGS. 7 and 8 will be discussed simultaneously below. The parts and reference numerals included in this discussion are shown in either one or both of FIGS. 7 and 8. As indicated previously, the electronic contact panel 140 is disposed on a step 136. The electronic contact panel 140 may comprise a first electronic contact strip 142a, a second electronic contact strip 142b, a third electronic contact strip 142c, a fourth electronic contact strip 142d, a fifth electronic contact strip 142e and an intermittent electronic contact pathway 144.

The electronic contact panel 140 may comprise a first dimension 107a (e.g. height), a second dimension 107b (e.g., width) and a third dimension 107c (e.g., depth). The first dimension 107a, second dimension 107b, and third dimension 107c are mutually perpendicular. The third dimension 107c is represented by a dot inside the circle on FIG. 8. The third dimension 107c is perpendicular to a plane defined by the first dimension 107a and the second dimension 107b.

Each of the electronic contact strips 142a-e may each comprise a perpendicular region 145a-e. Each perpendicular region 145a-e extends away from a remainder of each electronic contact strip 142a-e along the third dimension 107c.

The intermittent electronic contact pathway 144 may comprise a first noncontact region 148a, a second noncontact region 148c and an electronic contact region 148b disposed between the first noncontact region 148a and the second noncontact region 148c. The electronic contact region 148b is in electrical communication with one or more of the valves 172a-d within the manifold member 150, while the first noncontact region 148a and the second noncontact region 148c are either formed of non-conductive material (e.g., a polymer) or are otherwise not in electrical communication with any of the valves 172a-d. The electronic contact strips 142a-e are in electronic communication with various components within the manifold member 150. These components will be discussed subsequently.

The electronic contact panel 140 may comprise two ends 141, 149 and three intervening regions 143a, 143b, 143c distributed along the first dimension 107a and extending along the entirety of the second dimension 107b. In particular, an entry end 141 and a fully engaged end 149 are disposed at opposite ends of the electronic contact panel 140 along the first dimension 107a. An entry region 143a is positioned adjacent to the entry end 141 and is disposed intermediate the entry end 141 and an intermediate region 143b along the first dimension 107a. A fully engaged region 143c is disposed between the intermediate region 143b and the fully engaged end 149 along the first dimension 107a. The entry region 143a is aligned with and the same size as the first noncontact region 148a of the intermittent electronic contact pathway 144 along the first dimension 107a. The intermediate region 143b is aligned with and the same size as the electronic contact region 148b of the intermittent electronic contact pathway 144 along the first dimension 107a. The fully engaged region 143c is aligned with and the same size as the second noncontact region 148c of the intermittent electronic contact pathway 144 along the first dimension 107a. The purpose of each one of these regions 148a-e will be explained further below.

Figure 9:
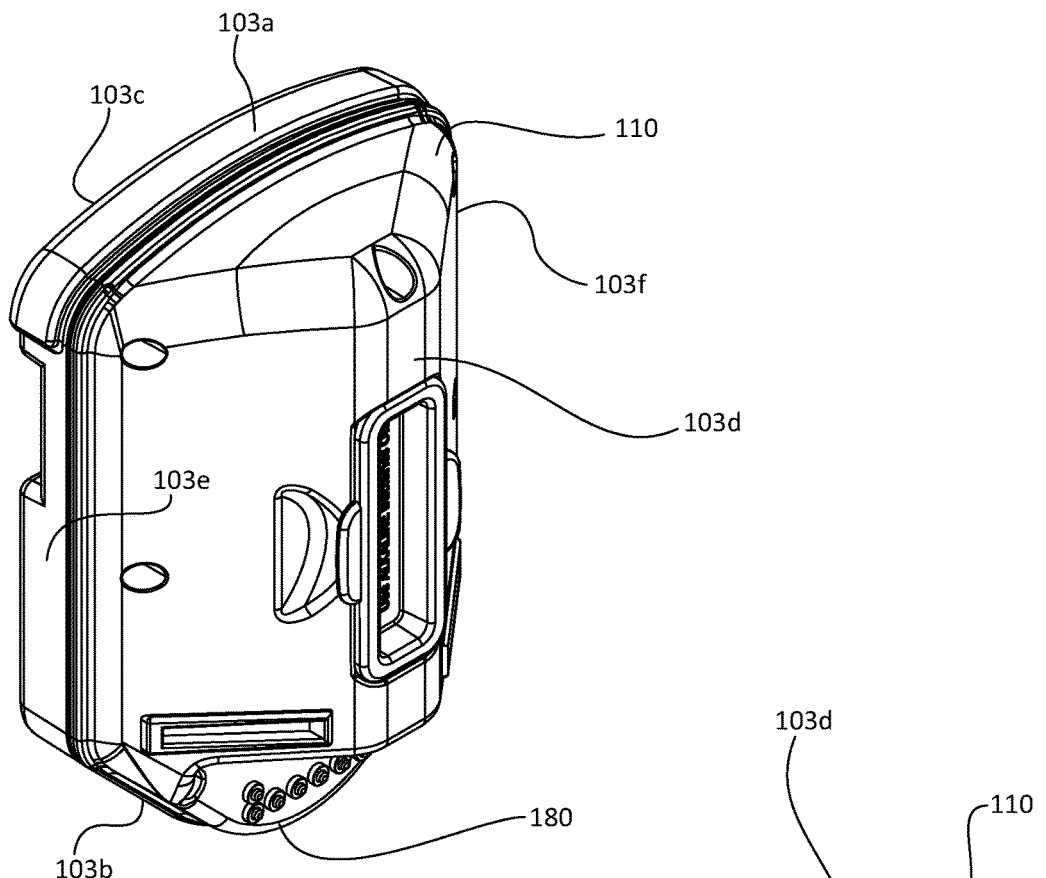
FIG. 9 is an elevated, rear perspective view of the control member of a hose tap timer shown in FIG. 1.
Figure 10:
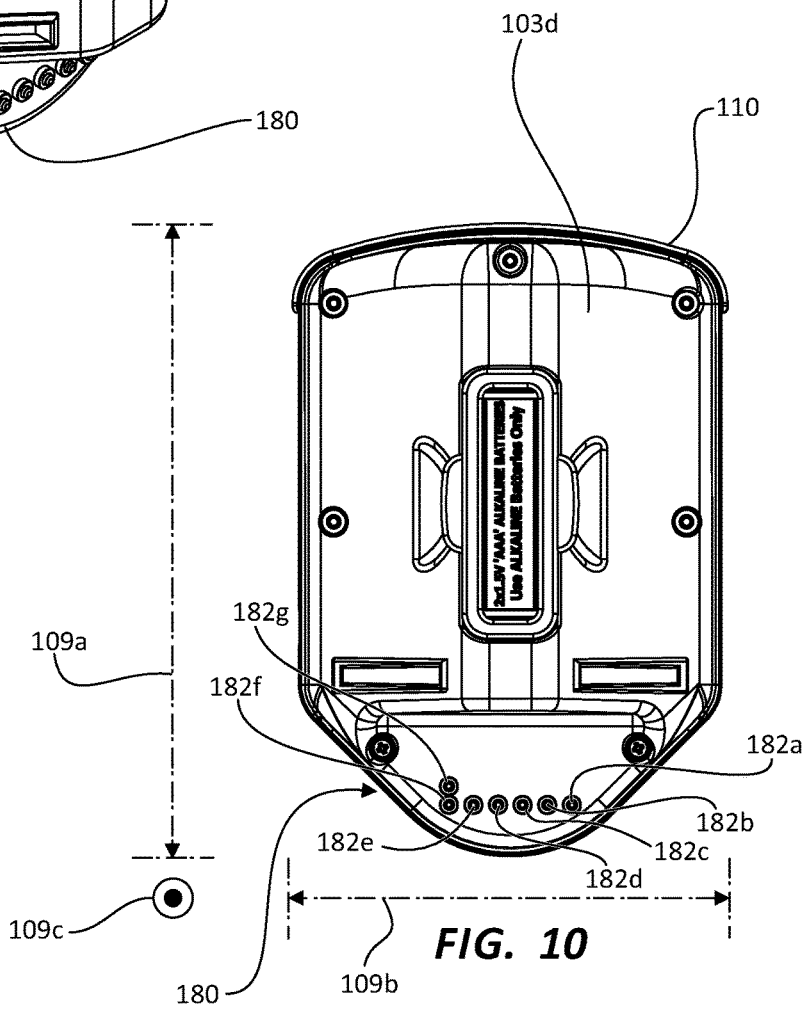
FIG. 10 is a rear view of the control member of the hose tap timer shown in FIG. 1.

FIG. 9 is an elevated, rear perspective view of the control member 110 of the hose tap timer 100 shown in FIG. 1, while FIG. 10 is a rear view of the control member 110. FIGS. 9 and 10 will be discussed simultaneously below. Parts and reference numerals included in this discussion will be shown in either one or both of FIGS. 9 and 10.

The control member 110 includes a top side 103a, a bottom side 103b, a front side 103c, a back side 103d, a first lateral side 103e and a second lateral side 103f. The control member 110 includes a first dimension 109a (e.g., height), a second dimension 109b (e.g., the width) and a third dimension 109c (e.g., depth). The first dimension 109a is perpendicular to the second dimension 109b. The third dimension 109c is perpendicular to both the first dimension 109a and the second dimension 109b. The third dimension 109c is represented by a dot within a circle to indicate that the third dimension 109c is perpendicular to a plane defined by the first dimension 109a and the second dimension 109b, shown in FIG. 10.

A set of contact prongs 180 are disposed on the back side 103d. Each one of the contact prongs 180 are in electronic communication with one or more components within the control member 110. These components will be discussed in connection with FIG. 12.

The set of contact prongs 180 comprises a first contact prong 182a, a second contact prong 182b, a third contact prong 182c, a fourth contact prong 182d, a fifth contact prong 182*e*, a sixth contact prong 182*f* and a seventh contact prong 182*g*. The first through the sixth contact prongs 182*a-f* are aligned along the first dimension 109*a* and are offset along the second dimension 109*b*. The sixth contact prong 182*f* and the seventh contact prong 182*g* are aligned along the second dimension 109*b* and are offset along the first dimension 109*a*. All of the contact prongs 182*a-g* are aligned along the third dimension 109*c*. Each of the contact prongs 182*a-g* may be spring-loaded to provide contact with the electronic contact panel 140, as will be explained below.

FIGS. 11A-E comprise front perspective views of region 7 shown in FIG. 6 with each of these figures illustrating various stages of interaction between the contact prongs 182*a-g* of the control member 110 with an electronic contact panel 140 of the manifold member 150 during the docking or undocking process. In FIGS. 11A-E, a mirror image of the contact prongs 182*a-g* is shown in broken lines to better illustrate this interaction. For consistency and simplicity, reference numerals mentioned in any of FIGS. 11A-E are included in each of these figures.

Figure 11:
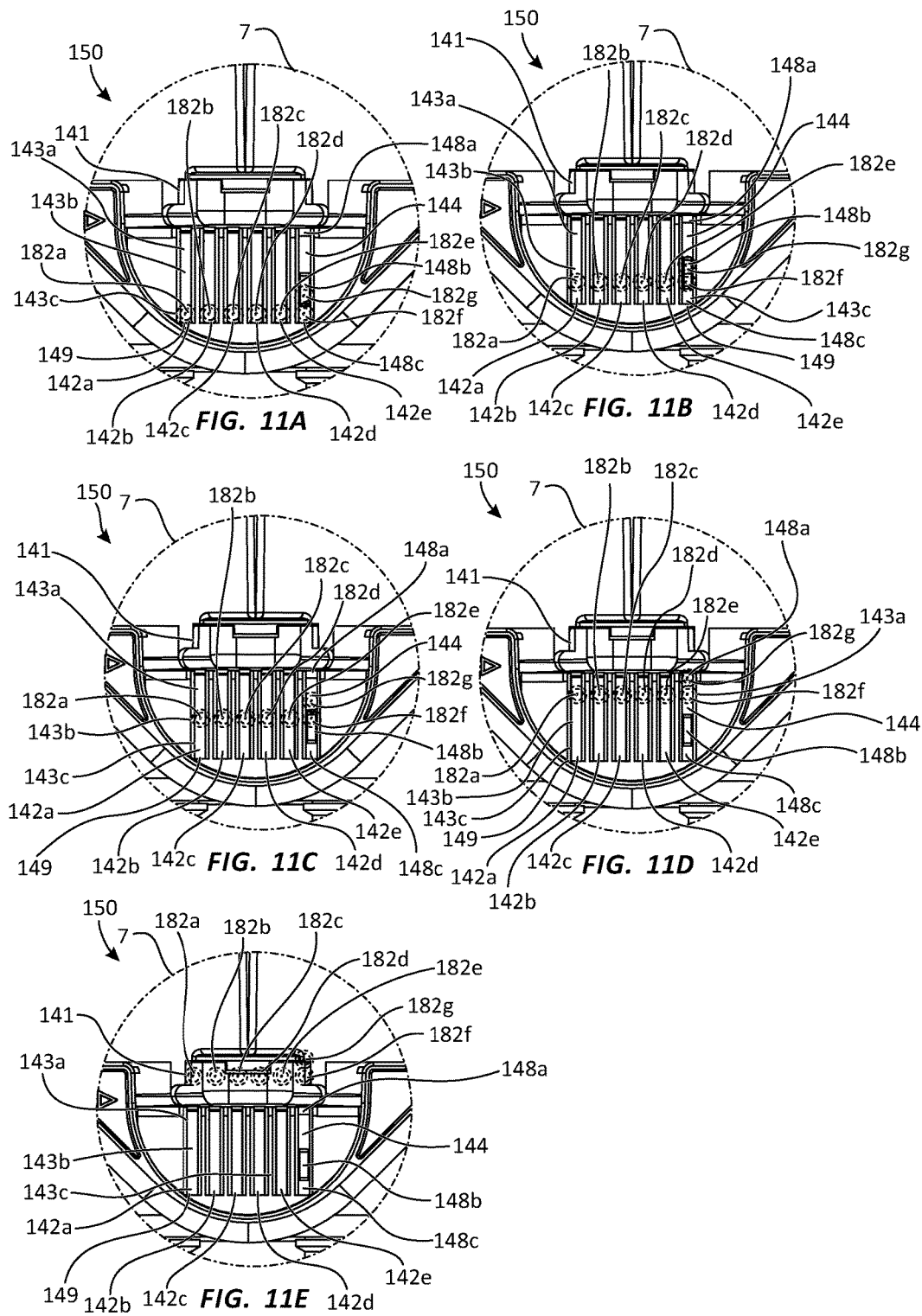
FIGS. 11A-E comprise front perspective views of the region shown in FIG. 8 illustrating various stages of interaction between contact prongs of the control member with an electronic contact panel of the manifold member.

FIG. 11A illustrates the position of the contact prongs 182*a-g* with respect to the electronic contact panel 140 when the control member 110 is in a fully engaged position with respect to the manifold member 150. In this position, the first through the sixth contact prongs 182*a-f* are positioned within the fully engaged region 143*c*. Accordingly, the first through the fifth contact prongs 182*a-e* contact the first through the fifth electronic contact strips 142*a-e*, respectively, within the fully engaged region 143*c*. The sixth contact prong 182*f* contacts the second noncontact region 148*c* of the intermittent electronic contact pathway 144, which is within the fully engaged region 143*c*. The seventh contact prong 182*g* contacts the electronic contact region 148*b*, which is within the intermediate region 143*b*.

FIG. 11B illustrates the position of the contact prongs 182*a-g* with respect to the electronic contact panel 140 when the control member 110 is in an intermediate engaging position with respect to the manifold member 150. In this position, all of the contact prongs 182*a-g* are within the intermediate region 143*b*. Accordingly, the first through the fifth contact prongs 182*a-e* contact the first through the fifth electronic contact strips 142*a-e*, respectively, within the intermediate region 143*b*. Furthermore, both the sixth and the seventh contact prongs 182*f-g* contact the electronic contact region 148*b* of the intermittent electronic contact pathway 144 and are thus within the intermediate region 143*b*. The positioning of both the sixth and the seventh contact prongs 182*f-g* in contact with the electronic contact region 148*b* may signify that the control member 110 is being withdrawn from the manifold member 150. In one embodiment, the contact of both the sixth and the seventh contact prongs 182*f-g* with the electronic contact region 148*b* may complete an electronic circuit to enable the circuitry within the control member 110 to detect that the intermediate position has been reached.

As a result of detection of the contact of both the sixth and the seventh contact prongs 182*f-g* with the electronic contact region 148*b*, a close valve signal may be sent through one or more of the first through fifth contact prongs 182*a-e* to close all of the valves 172*a-d* or any valves 172*a-d* that may be in an open state. The close valve signal must be sent rapidly before the first through the fifth contact prongs 182*a-e* lose contact with the first through the fifth electronic contact strips 142*a-e*. In one embodiment, for example, the close valve signal must be sent within 200 ms, which includes a 50 ms pulse duration and a cushion of 150 ms before contact is lost between the contact prongs 182*a-e* and the electronic contact strips 142*a-e*. This procedure is designed to prevent the valves 172*a-d* from being left in an open state when the control member 110 is withdrawn from the manifold member 150.

FIGS. 11C-D illustrate the position of the contact prongs 182*f-g* of the control member 110 with respect to the electronic contact panel 140 of the manifold member 150 in two different entry engaging positions. In FIG. 11C, each of the first through the sixth contact prongs 182*a-f* are still positioned within the intermediate region 143*b*. Accordingly, the first through the fifth contact prongs 182*a-e* contact the first through the fifth electronic contact strips 142*a-e*, respectively, within the intermediate region 143*b*. This contact enables transmission, or continued transmission, of the close valve signals through the contact prongs 182*a-e*. However, the seventh contact prong 182*g* is positioned within the entry region 143*a* and accordingly, is in contact with the first noncontact region 148*a* and is no longer in contact with the electronic contact region 148*b*. Accordingly, when either the sixth or the seventh contact prongs 182*f-g* are positioned within the first noncontact region 148*a*, the control member 110 is within an entry engaging position.

FIG. 11D, as indicated above, also illustrates the control member 110 in an entry position with respect to the manifold member 150. In FIG. 11D, all of the contact prongs 182*a-g* are positioned within the entry region 143*a*. In this state, of course, the sixth and seventh contact prongs 182*f-g* contact the first noncontact region 148*a* and thus no longer contact the electronic contact region 148*b*. Once again, the first through the fifth contact prongs 182*a-e* contact the first through the fifth electronic contact strips 142*a-e*, respectively, within the intermediate region 143*b*. This contact enables transmission, or continued transmission, of the close valve signals through the contact prongs 182*a-e*.

FIG. 11E illustrates a disengaged position, in which none of the contact prongs 182*a-g* are in contact with the electronic contact panel 140. Of course, no wired electronic communication can occur between the control member 110 and the manifold member 150 in this position.

Figure 12:
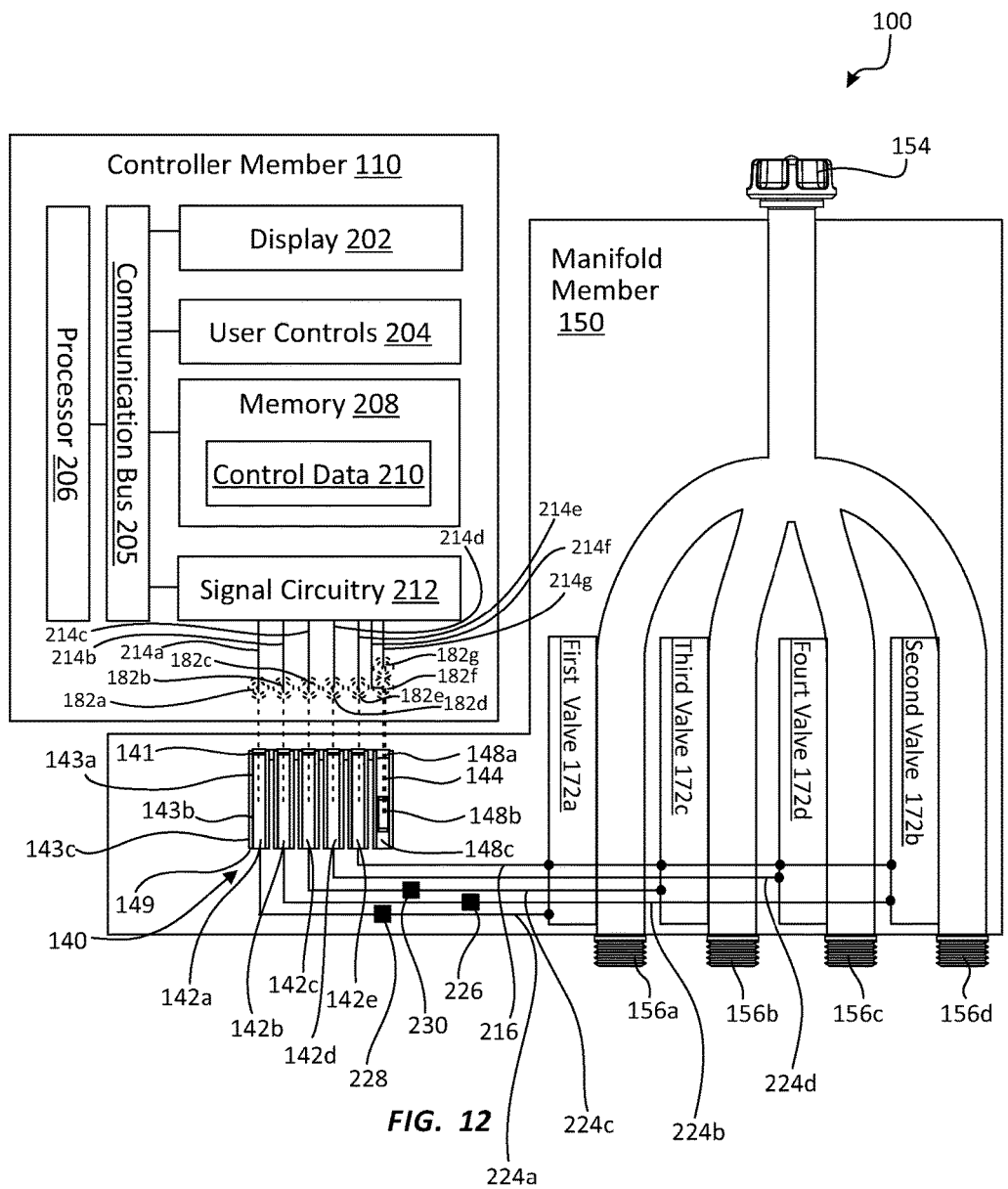
FIG. 12 is a block diagram illustrating one embodiment of the hose tap timer.

FIG. 12 is a block diagram illustrating one embodiment of the hose tap timer 100. In FIG. 12, a mirror image of the contact prongs 182*a-g* is shown in broken lines to better represent the interaction between the contact prongs 182*a-g* and the electronic contact panel 140. The broken lines between the contact prongs 182*a-g* and the first through fifth electronic contact strips 142*a-e* and the electronic contact region 148*b* of the intermittent electronic contact pathway 144 illustrate potential contact, which enables the transmission of electronic signals between the contact prongs 182*a-g* and the electronic contact strips 142*a-e* and the electronic contact region 148*b*.

As illustrated, the control member 110 may include a processor 206. The processor 206 may comprise, for example, a central processing unit (CPU) or microcontroller (MCU) or other circuitry that can receive and process binary or other commands and temporarily store data. Working in connection with the memory component 208, the processor 206 may execute steps to be performed by the control member 110. The processor 206 may be, directly or indirectly, in electronic communication with a display component 202, a user controls component 204, a memory component 208, and a signal circuitry component 212. In one embodiment, a communication bus 205 enables communication between each of the electronic components 202, 204, 206, 208, 212 in the control member 110.

The processor 206 may transmit signals to the display component 202 to display, for example, available user options and/or the status of the control member 110 on the display screen 114. The display component 202 may further comprise electronic circuitry that processes signals received from the processor 206 to enable proper display of information on the display screen 114.

The user controls component 204 may comprise user controls 116, including both physical and electronic user controls (such as a touch screen), and circuitry necessary to convert received touch input from the user controls 116 into electronic signals that may be received and processed by the processor 206.

The memory component 208 may comprise volatile or non-volatile memory, such as flash memory, a hard disk drive, and/or random access memory (RAM). Accordingly, the memory component 208 may store volatile and/or non-volatile data.

Control data 210 may be stored within the memory component 208. The control data 210 dictates when open valve signals 226 and close valve signals 228 are sent to the valves 172a-d. Also, in certain embodiments, intermediate state valve signals 230 may be generated and transmitted. An intermediate state valve signal 230 places a particular valve 172a-d in a partially open state. In one embodiment, the valves 172a-d may comprise "latching" valves 172a-d. In such an instance, an open valve signal 226 or a close valve signal 228 is sent only for a brief period of time to transition the state of the valve 172a-d (e.g., the open valve signal 226 does not need to be maintained in order to keep the valve 172a-d in an open state).

The signal circuitry component 212 may send and receive electronic signals via the contact prongs 182a-g. Accordingly, the signal circuitry component 212 may process signals from the processor 206 and convert those into signals that may be sent via the contact prongs 182a-g. The signal circuitry component 212 may be in communication with each of the prongs 182a-g through a series of signal lines 214a-g. The signal circuitry component 212 may include, for example, TRIACs (three-electrode semiconductor devices that will conduct in either direction) that may be utilized to generate, for example, an open valve signal 226, a close valve signal 228 or an intermediate state valve signal 230. In one embodiment, the open valve signal 226 and the close valve signal 228 are identical electronically and merely transition the valve to a next state (e.g., from a closed state to an open state or vice versa).

The signal circuitry component 212, working in conjunction with the processor 206 and the control data 210, may, for example, determine when a circuit is closed between the sixth and the seventh contact prongs 182g-f (e.g., when the sixth and seventh contact prongs 182g-f simultaneously contact the electronic contact region 148b). After such a determination is made, working with the processor 206 and the control data 210, the signal circuitry component 212 may cause a close valve signal 228 to be sent via one or more of the first through the fourth contact prongs 182a-b. This procedure, as indicated previously, is intended to cause the valves 172a-d to close before withdrawal of the control member 110 from the manifold member 150. In addition, this same procedure may operate to close all valves 172a-d when the control member 110 is inserted into the manifold member 150 because during the course of inserting the control member 110 into the manifold member 150, the sixth and seventh contact prongs 182g-f simultaneously contact the electronic contact region 148b.

The manifold member 150 may comprise an electronic contact panel 140 in electronic communication with a number of valves 172a-d. The fluid input coupling 154 is in fluid communication with a first fluid output coupling 156a, a second fluid output coupling 156b, a third fluid output coupling 156c and a fourth fluid output coupling 156d.

As indicated previously, the electronic contact panel 140 may comprise five electronic contact strips 142a-e and an intermittent electronic contact pathway 144. The intermittent electronic contact pathway 144 may comprise a first noncontact region 148a, an electronic contact region 148b and a second noncontact region 148c. The electronic contact strips 142a-e and the intermittent electronic contact pathway 144 may comprise an entry end 141 and a fully engaged end 149. As indicated previously, the electronic contact strips 142a-e and the intermittent electronic contact pathway 144 may be divided into an entry region 143a, an intermediate region 143b and a fully engaged region 143c.

The first electronic contact strip 142a is in electronic communication with the first valve 172a via a first valve control line 224a. In addition, the fifth electronic contact strip 142e is in electronic communication with the first valve 172a via a ground line 216. Thus, the first valve control line 224a and the ground line 216 enable a circuit to be completed with the first valve 172.

The second electronic contact strip 142b is in electronic communication with the second valve 172b via a second valve control line 224b. In addition, the fifth electronic contact strip 142e is in electronic communication with the second valve 172b via a ground line 216. Thus, the second valve control line 224b and the ground line 216 enable a circuit to be completed with the second valve 172b.

The third electronic contact strip 142c is in electronic communication with the third valve 172c via a third valve control line 224c. In addition, the fifth electronic contact strip 142e is in electronic communication with the third valve 172c via a ground line 216. Thus, the third valve control line 224c and the ground line 216 enable a circuit to be completed with the third valve 172c.

The fourth electronic contact strip 142d is in electronic communication with the fourth valve 172d via a fourth valve control line 224d. In addition, the fifth electronic contact strip 142e is in electronic communication with the fourth valve 172d via a ground line 216. Thus, the fourth valve control line 224d and the ground line 216 enable a circuit to be completed with the fourth valve 172d.

When the control member 110 is in the fully engaged position with respect to the manifold member 150, electronic signals 226, 228, 230 generated by the signal circuitry component 212 may be transmitted to one or more of the valves 172a-d. For example, the signal circuitry component 212 may transmit an open valve signal 226 through the first signal line 214a, the first contact prong 182a, the first electronic contact strip 142a, and the first valve control line 224a to the first valve 172a, causing the first valve 172a to transition to an open state, allowing pressurized fluid from the fluid input coupling 154 to pass through the first valve 172a and exit the manifold member 150 via the first fluid output coupling 156a.

In this condition, if the user decides to withdraw the controller member 110 from the manifold member 150, the sixth and seventh prongs 182f-g will enter the intermediate region 143b and simultaneously contact the electronic contact region 148b. In response to this simultaneous contact (e.g., a circuit is closed), the signal circuitry component 212 will cause a close valve signal 228 to be transmitted through the first signal line 214a, the first contact prong 182a, the first electronic contact strip 142a, and the first valve control line 224a to the first valve 172a, causing the first valve 172a to transition to a closed state. This action will prevent pressurized fluid within the manifold member 150 from passing through the first valve 172a. Again, the close valve signal 228 must be transmitted rapidly before contact between the first contact prong 182a and the first electronic contact strip 142a has been terminated by withdrawal of the control member 110 from the manifold member 150.

In one embodiment, only one of the valves 172a-d may be open at a single time. In an alternative embodiment, one or more valves 172a-d may be open simultaneously. In either case, the close valve signal 228 may be sent to all of the open valves 172a-d, or all of the valves 172a-d (irrespective of whether a particular valve 172a-d is in an open state), when simultaneous contact of the sixth and seventh prongs 182f-g with the electronic contact region 148b is detected.

It should be noted that the foregoing information is merely illustrative. For example, the disclosed subject matter may include more or less than four valves 172a-d. Accordingly, the corresponding number of electronic contact strips 142a-e may be varied as well. Furthermore, the shape and configuration of the intermittent electronic contact pathway 144 may be varied as well. For example, the sixth and seventh contact prongs 182f-g may be offset along the second dimension 107b (shown in FIG. 8) and aligned along the first dimension 107a (shown in FIG. 8). In such an embodiment, the intermittent electronic contact pathway 144 may be wider than depicted in the figures to enable simultaneous contact and accommodate the sixth and seventh contact prongs 182f-g.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art and the generic principles defined herein may be applied to all other aspects without departing from the scope of the disclosure. Thus, the present disclosure is not intended to be limited to the aspects shown herein but is to be accorded the widest scope consistent with the principles and novel features disclosed.

What is claimed is:

1. A hose tap timer, comprising:
  a control member comprising:
    a processor;
    a memory component in electronic communication with the processor, the memory component comprising control data specifying when electronic signals will be sent to a particular valve; and
    at least a first contact prong, a second contact prong, and a third contact prong; and
    a signal circuitry component in communication with the processor and in communication with each of the first contact prong, second contact prong, and third contact prong;
  a manifold member comprising:
    a fluid input coupling;
    one or more fluid output couplings, each of the one or more fluid output couplings in fluid communication with the fluid input coupling along a fluid pathway associated with each of the one or more fluid output couplings;
    a valve coupled to each fluid pathway, each valve controllable in response to electronic signals to move between an open and a closed state; and
  a dock shaped to receive the control member in an entry engaging position, an intermediate engaging position, and a fully engaged position;
  the dock comprising:
    an electronic contact panel comprising:
      a first dimension and a second dimension, the first dimension being perpendicular to the second dimension;
      an entry end;
      an entry region;
      an intermediate region;
      a fully engaged region;
      a fully engaged end, the entry region being disposed intermediate the entry end and the intermediate region along the first dimension and the fully engaged region being disposed intermediate the intermediate region and the fully engaged end along the first dimension;
      a first electronic contact strip extending continuously along the first dimension from the entry end to the fully engaged end; and
      an intermittent electronic contact pathway extending along the first dimension from the entry end to the fully engaged end, the intermittent electronic contact pathway being offset from the first electronic contact strip along the second dimension, the intermittent electronic contact pathway comprising a first noncontact region disposed within the entry region, an electronic contact region disposed within the intermediate region, and a second noncontact region disposed within the fully engaged region;
  wherein when the control member is in the entry engaging position, the first contact prong is positioned on the control member to contact the first electronic contact strip within the entry region and the second and third contact prongs are positioned on the control member to contact the first noncontact region,
  wherein when the control member is in the intermediate engaging position, the first contact prong is positioned on the control member to contact the first electronic contact strip within the intermediate region and the second and third contact prongs are positioned on the control member to contact the electronic contact region; and
  wherein when the control member is in the fully engaged position, the first contact prong is positioned on the control member to contact the first electronic contact strip within the fully engaged region, the second contact prong is positioned on the control member to contact the second noncontact region and the third contact prong is positioned on the control member to contact the electronic contact region.

2. The hose tap timer of claim 1, wherein in response to the second and third contact prongs simultaneously contacting the electronic contact region, the control data is configured to transmit a close valve signal via the first contact prong.

3. The hose tap timer of claim 1, wherein in response to the second and third contact prongs simultaneously contacting the electronic contact region, the control data is configured to transmit a close valve signal via the first contact prong only if a valve in electronic communication with the first contact prong is in an open state.

4. The hose tap timer of claim 1, further comprising a display screen in electronic communication with the processor.

5. The hose tap timer of claim 1, further comprising one or more user controls in electronic communication with the processor for altering the control data.

6. A method of causing one or more valves in a manifold member of a hose tap timer to be changed to a closed state when a control member of the hose tap timer is withdrawn from a dock of the manifold member, the control member comprising at least one contact prong that engages an electronic contact panel of the dock of the manifold member when the control member is an entry engaging position, an intermediate engaging position, and a fully engaged position with respect to the manifold member, the control member further comprising a first contact prong and a second contact prong that simultaneously engage an electronic contact region of the electronic contact panel only when the control member is in the intermediate engaging position with respect to the manifold member, the method comprising:

detecting when the control member is in the intermediate engaging position with respect to the manifold member based on simultaneous contact of the first and second contact prongs with the electronic contact region of the electronic contact panel; and in response to detecting that the control member is in the intermediate engaging position with respect to the manifold member, transmitting at least one close valve signal from the control member to the manifold member.

7. The method of claim 6, wherein the at least one close valve signal is transmitted while the control member is in the entry engaging position with respect to the manifold member.

8. The method of claim 6, wherein the at least one close valve signal is transmitted while the control member is in the fully engaged position with respect to the manifold member.

* * * * *